March 14, 1961  H. D. WITZEL  2,974,668
CENTRIFUGAL TYPE THRESHER
Filed Dec. 10, 1957  6 Sheets-Sheet 2

INVENTOR.
Homer D. Witzel
BY
Dorris, McDougall,
Williams & Versh
Attorneys

United States Patent Office 2,974,668
Patented Mar. 14, 1961

2,974,668

CENTRIFUGAL TYPE THRESHER

Homer D. Witzel, Bettendorf, Iowa, assignor to Harvestaire, Inc., San Francisco, Calif., a corporation of California Filed Dec. 10, 1957, Ser. No. 701,753

11 Claims. (Cl. 130—27)

This invention relates to threshing machines for separating kernels of grain from unthreshed grain.

One object of the present invention is to provide a new and improved threshing machine having much greater capacity than prior machines of comparable size.

A further object is to provide a new and improved threshing machine which will operate equally well in any position, so that the machine may be employed, as part of a combine, on hillsides or other slopes without any need for adjusting, levelling, or compensating mechanisms.

It is another object to provide a threshing machine in which the threshing is done entirely by the action of a threshing fan, and in which the straw, chaff, and unthreshed heads are separated from the grain kernels by centrifugal action, in cooperation with controlled air streams.

A further object is to provide a threshing machine in which all of the movable threshing and separating components are rotary, so that the machine will operate with negligible vibration and very little wear on the moving parts.

Another object is to provide a new and improved threshing machine which threshes grain and separates the grain kernels with high efficiency, so that virtually no grain is lost, yet is capable of handling a considerably greater volume of grain than prior machines of comparable size.

A further object is to provide such a new and improved threshing machine which does not crack or otherwise damage the grain kernels to any appreciable extent.

Still another object is to provide a new and improved threshing machine which achieves all of these advantages, yet is remarkably simple in construction and low in cost.

Further objects and advantages of the present invention will appear from the following description, taken with the accompanying drawings, in which.

Figure 1:
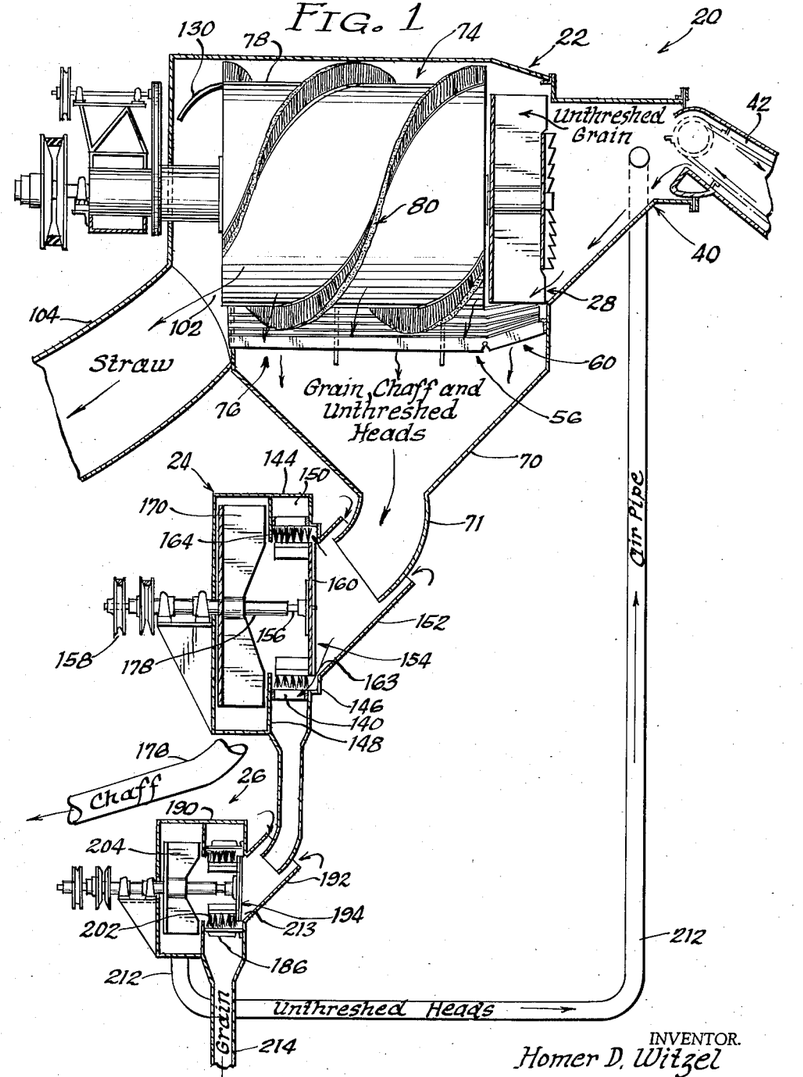
Fig. 1 is a somewhat diagrammatic elevational sectional view of a threshing machine to be described as an illustrative embodiment of the present invention.

It will be apparent that Fig. 1 illustrates a threshing machine 20 adapted to loosen and separate the kernels of grain from any desired kind of unthreshed grain or other seed crop, such as wheat, rye, oats, beans, corn or the like. The illustrated threshing machine 20 operates in four stages. The first two stages are combined in a unit 22 which threshes the grain and removes the straw therefrom. The grain kernels, mixed with varying amounts of chaff and unthreshed heads, are fed to a chaff separator 24 which removes the chaff. Finally, the grain kernels and unthreshed heads pass to a final separator or cleaner 26 which removes the unthreshed heads from the kernels. The cleaned grain is drawn off from the final separator 26, while the unthreshed heads are returned to the combination unit 22 for rethreshing.

Figures 2, 7:
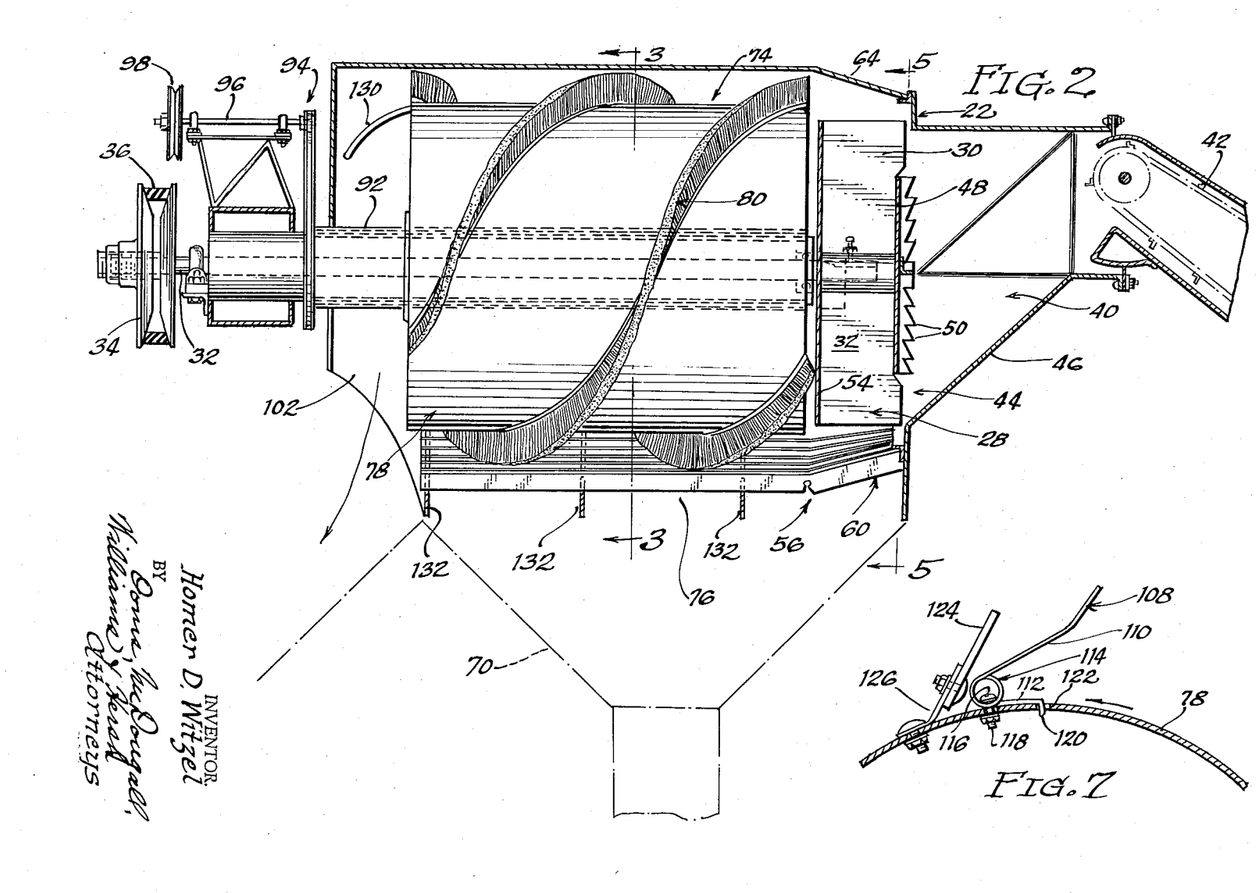
Fig. 2 is an enlarged longitudinal elevational sectional view showing a combination threshing and straw separating unit embodied in the threshing machine of Fig. 1.
Fig. 7 is a fragmentary cross-sectional view, similar to Fig. 3, but showing a modification.
Figure 5:
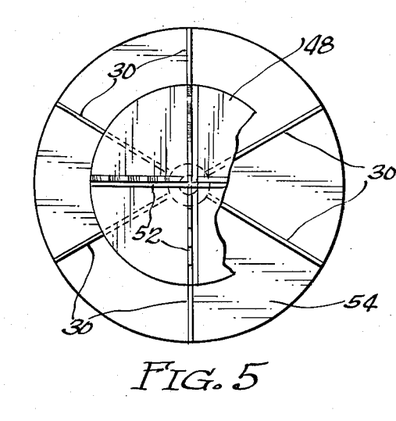
Fig. 5 is a fragmentary elevational view showing the front end of a threshing fan embodied in the unit of Fig. 2, the view being taken as indicated by the line 5—5 in Fig. 2.

In the combination threshing and separating unit 22, the threshing is done by a centrifugal threshing fan 28, shown to best advantage in Figs. 2 and 5. While the construction of the fan 28 may be varied to a considerable extent, the illustrated fan has six blades or paddles 30 which are positioned in radial planes extending through the axis of the fan. The number of blades may be varied for various types of grain, or to suit varying conditions. Increasing the number of blades will generally tend to increase the threshing ability of the fan. The size of the fan 28 will depend on the desired capacity for the threshing machine. Merely by way of example, it has been found a 30 inch fan gives extremely great threshing capacity.

The illustrated threshing fan 28 is secured to the outer end of a shaft 32 which is adapted to be rotated at high speed. Various suitable means may be provided to drive the shaft 32. In this case, the opposite or inner end of the shaft 32 is fitted with an adjustable V groove pulley 34, whereby the speed of the shaft may be varied. A suitable V belt 36 may be employed to connect the pulley 34 to a motor or the like (not shown).

The speed at which the fan 28 is driven will depend upon the type of grain, the desired threshing capacity, and other operating factors. For threshing wheat or the like, a typical speed would be about 1000 r.p.m. However, under various conditions and for various types of grain, the speed might be made considerably higher, or might be decreased to perhaps 300 r.p.m. or even lower.

In the illustrated threshing unit 22, unthreshed grain is fed into the threshing fan 28 through an entrance chute 40. An endless chain or belt type conveyor 42, or any other suitable means, may be employed to dump the unthreshed grain into the chute 40. It will be seen that the chute 40 flares to an entrance opening 44 adjacent the outer end of the fan 28. As shown, the entrance opening 44 is slightly smaller in diameter than the diameter of the fan 28. The chute 40 has a downwardly sloping lower wall portion 46 so that the unthreshed grain will slide into the fan 28 by gravity.

The unthreshed grain is excluded from the central portion of the fan 28, and is directed into the outer portion of the fan by means of a disc or shield 48 mounted on the outer end of the fan. The disc 48 is somewhat smaller in diameter than the fan so that the outer portion of the fan is left exposed. To throw the grain outwardly, the disc 48 is formed with teeth 50 which project forwardly from the disc. In this case, the teeth 50 are formed on diametrically extending angle bars 52 positioned at 90° intervals on the disc 48. The toothed bars 52 agitate the unthreshed grain and tend to prevent any wadding or bunching of the grain in the chute 40. Moreover, the disc 48 and the bars 52 tend to prevent the grain from being twisted into ropes by the rapidly revolving fan.

It will be apparent that the unthreshed grain is introduced into the fan 28 near the outer ends of the rapidly moving blades 30. The flail effect of the blades is sufficient to bring about virtually complete threshing of the grain. In other words, the rapidly revolving blades strike the unthreshed grain with sufficient shock to loosen virtually all of the grain kernels from the stalks. The speed of the fan may be varied to insure complete threshing of the grain, while avoiding any tendency for the fan to crack, hull or otherwise damage the grain kernels.

To a considerable extend the unthreshed grain is drawn into the fan by the in rushing air due to the suction produced by the fan. The loosened grain kernels, straw and other light material are thrown outwardly from the fan 28 by centrifugal action and the outward air blast of the fan. With normal fan speeds, the materials are thrown out of the fan 28 with a force which is many times the force of gravity. To prevent the materials from passing completely through the fan longitudinally, the rear end of the fan is closed by a plate or disc 54.

Many or most of the grain kernels, thrown outwardly by the fan 28, pass immediately through a grating or louver assembly 56 which is provided around the fan. The grating 56 extends rearwardly from the fan, as will be described in greater detail shortly. It will be seen that the illustrated grating 56 is made up of a large number of louvers or grating bars 58 which extend longitudinally of the fan 28. The bars 58 are spaced apart at regular angular intervals around the fan and are positioned edgewise in generally radial planes which include the axis of the fan. The grating 56 has a portion 60, disposed immediately around the fan, which is generally frusto-conical in shape. The frusto-conical portion 60 flares toward the rear of the fan 28 so that the mass of straw and grain kernels will spread out as it passes rearwardly from the fan.

Figure 3:
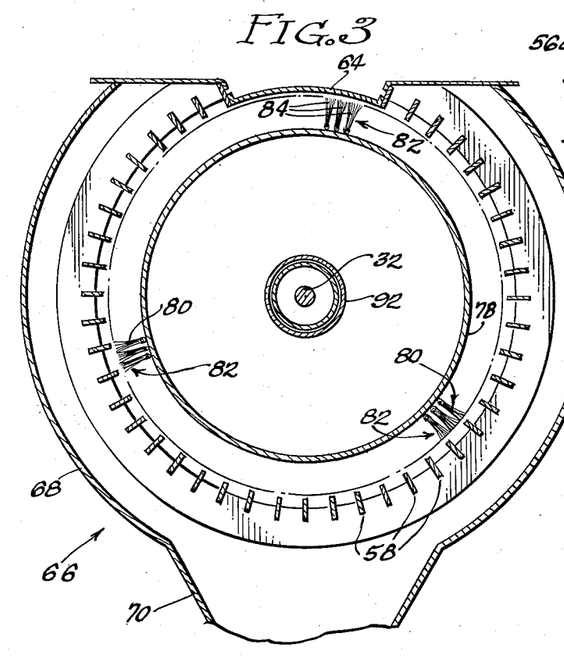
Fig. 3 is a transverse elevational sectional view taken generally along a line 3—3 in Fig. 2.

In the arrangement of Figs. 2 and 3, the grating 56 extends entirely around the fan 28, except for the region adjacent the uppermost extremity of the fan, where the grating bars 58 are omitted to save space and reduce the height of the machine. The curved plate 64 is positioned above the fan to close the gap in the grating 56. It will be seen that the plate 64 is part of a casing 66 which extends around the grating 56 to receive and carry off the grain kernels and any other material that is thrown through the grating. Thus, the casing 66 has a generally cylindrical wall 68 which extends around the grating 56 and is spaced outwardly therefrom. The casing 66 has a hopper bottom 70 which collects and carries off the kernels and other material. A discharge pipe 71 may be connected to the lower end of the hopper bottom 70.

Figure 4:
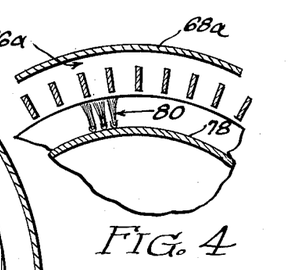
Fig. 4 is a fragmentary view similar to Fig. 3 but illustrating a modification.

Fig. 4 illustrates a slightly modified arrangement which is provided with a modified grating 56A extending entirely around the threshing fan. Likewise, the wall of the casing is modified to extend entirely around the grating, as shown at 68A. The centrifugal action tending to throw the grain kernels is much stronger than gravity, so that the kernels readily pass upwardly through the upper portion of the grating. Some of the kernels may fall back into the grating, but they are soon thrown out again. Many of the kernels pass downwardly in the casing outside the grating. It has been found that a completely circular grating provides the best separation of the grain kernels from the straw, although the upper portion of the grating may be omitted, as shown in Figs. 2 and 3, without any serious loss of separating efficiency.

From the fan 28, the straw and any remaining grain kernels pass rearwardly between the grating 56 and a whirler or sweeper member 74. In the construction illustrated in Figs. 2 and 3, the grating 56 has a generally cylindrical portion 76 around the whirler 74. The illustrated whirler 74 is in the form of a generally cylindrical drum 78 which is somewhat smaller in diameter than the inside of the cylindrical grating 76. Sweeping elements or impellers 80 extend outwardly from the drum 78 to sweep or slide the straw around the grating 76 and propel the straw rearwardly. Of course, the air blast from the fan 28 also propels the straw to a considerable extent.

Figure 6:
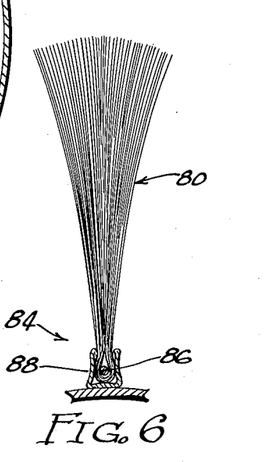
Fig. 6 is an enlarged fragmentary sectional view showing details of bristles employed in the unit of Figs. 2 and 3, the view being similar to a portion of Fig. 3.

The sweeping elements 80 may assume various forms, but are illustrated in Figs. 1–6 as long, stiff bristles arranged in spiral flights on the drum 78. Three such flights 82 are employed in the illustrated construction. Each flight 82 comprises three rows 84 of the bristles 80. As shown in Fig. 6, the bristles of each row 84 may be looped around a wire 86 and clamped in a channel bar 88 which may be secured to the drum 78. Various other means may be employed for mounting the bristles.

It will be apparent that the bristles 80 extend outwardly from the drum 78 into closely adjacent relation to the grating 76. Thus, the bristles 80 are effective to sweep the straw around the grating 76. At the same time, the bristle flights 82 propel the straw rearwardly along the grating because of the spiral angle of the flights. The whirling action of the bristles 80 generates a strong centrifugal force which throws any remaining grain kernels outwardly through the grating 76. The drum 78 may be rotated at such a speed that the centrifugal force is many times the force of gravity.

In this case, the drum 78 is mounted on a hollow shaft 92 which surrounds the fan shaft 32 and is coaxial therewith. Any suitable arrangement may be employed to drive the shaft 92. In this case, a chain and sprocket drive 94 is connected between the shaft 92 and a shaft 96. The chain drive 94 affords a speed reduction between the shafts 96 and 92. It will be seen that the illustrated shaft 96 is fitted with a pulley 98 which may be belted to any suitable motor or the like (not shown).

The speed of the sweeper drum 78 may be varied for various types of grain and different operating conditions. Merely by way of example, the sweeper drum has been operated successfully at a peripheral speed of about 2,200 feet per minute for use with wheat. At this speed, the centrifugal force generated by the drum 78 is about twenty-eight times the force of gravity, so that virtually all of the grain kernels are thrown through the grating 76. The sweeping action of the bristles 80 agitates or works the straw over the grating 76 so that the grain kernels can rapidly work their way outwardly through the mass of straw and into the grating. The collisions of the grain kernels with the inner edges of the grating bars assist in seperating the kernels from the straw. Any fine material such as chaff and any unthreshed heads pass through the grating with the grain kernels.

The grating bars are positioned sufficiently close together to prevent the straw from passing through the grating. In this regard, it should be noted that the openings or slots between the grating bars 58 have considerable depth, due to the edgewise disposition of the bars. Thus the edges of the grate bars 58 are presented to the bristles or impellers 80. This arrangement substantially prevents the straw from "hairpinning" outwardly through the grating 76. Thus, the grating is kept clear and unclogged, so that the grain can readily escape. At the same time, the escape of straw is held down to negligible proportions.

At the rear end of the separator drum 78, the casing 66 has an opening 102 through which the straw is discharged. A suitable pipe 104 may be provided to carry off the straw by the action of gravity and the blast of air provided by the fan 28 and the whirler drum 78. The straw may be discarded on to the ground or may be collected for baling.

Ordinary fibre bristles are extremely effective as sweeping elements on the separator drum 78. The bristles should be long, coarse and rather stiff. However, various other types of sweeping elements may be employed, such as spring fingers, rubber fingers, swinging hammers, and the like. Thus, Fig. 7 illustrates a modified arrangement in which the bristles 80 are replaced by spring fingers 108 made of spring wire. As in the case of the bristles, the spring fingers 108 are arranged in spiral flights on the drum 78. Various arrangements may be utilized to mount the fingers 108 on the drum 78. As shown in Fig. 7 each finger 108 is formed with outer and inner arms 110 and 112, with a coil 114 therebetween. A clamping bar or clip 116 may be threaded through the coils 114 of two or more spring fingers 108 and may be secured to the drum 78 by bolts 118 or other suitable fasteners. In this way the coils 114 are clamped to the drum 78. The inner arm 112 of each spring finger 108 extends along the periphery of the drum 78. At its outer end, the arm 112 is formed with a prong 120 which projects inwardly through a hole 122 in the drum, so as to prevent the spring finger from being swung or twisted out of position.

The outer arm 110 of each spring finger 108 extends outwardly and is angled rearwardly with respect to the direction of rotation, so that the spring finger will pass easily around the grating without snagging.

In front of each flight of spring fingers 108, a spiral strip or bar 124 of rubber or the like is mounted on the drum 78 by means of an angle bracket 126. The rubber flight 124 is also angled rearwardly with respect to the direction of rotation. Both the spring fingers 108 and the rubber flight extend outwardly into closely adjacent relation to the grating. In this case, the spring fingers 108 extend outwardly to a somewhat greater extent than the rubber flight 124. The rubber flight 124 confines ricocheting grain between the flights and prevents the straw from catching in the coils 114 of the spring fingers. Like the bristles, the spring fingers 108 sweep the straw around the grating and propel the straw rearwardly.

It should be noted that a curved blade or paddle 130 is mounted on the rear end of the separator drum 78 to fling the straw from the casing 68 through the discharge opening 102. The flinger blade 130 extends rearwardly and angles radially inwardly from the drum 78.

From Figs. 2 and 3, it will be seen that the louvers or grating bars 58 are mounted on generally circular plates orb ars 132 which extend around the outside of the grating 56 at intervals along the length thereof. The plates 132 project outwardly from the louvers 58 and thus act as partitions in the casing 68. The intermediately positioned partition plates 132 confine ricocheting grain and prevent the grain kernels from flying any great distance along the length of the casing. Thus, the partitions 132 prevent grain kernels from being thrown from the fan 28 or the whirler drum 74 rearwardly along the length of the casing. If such rearward travel of the grain kernels were permitted, some of the kernels might become mixed with the straw near the rear end of the whirler 74 and might be lost out of the straw discharge opening 102.

Figure 12:
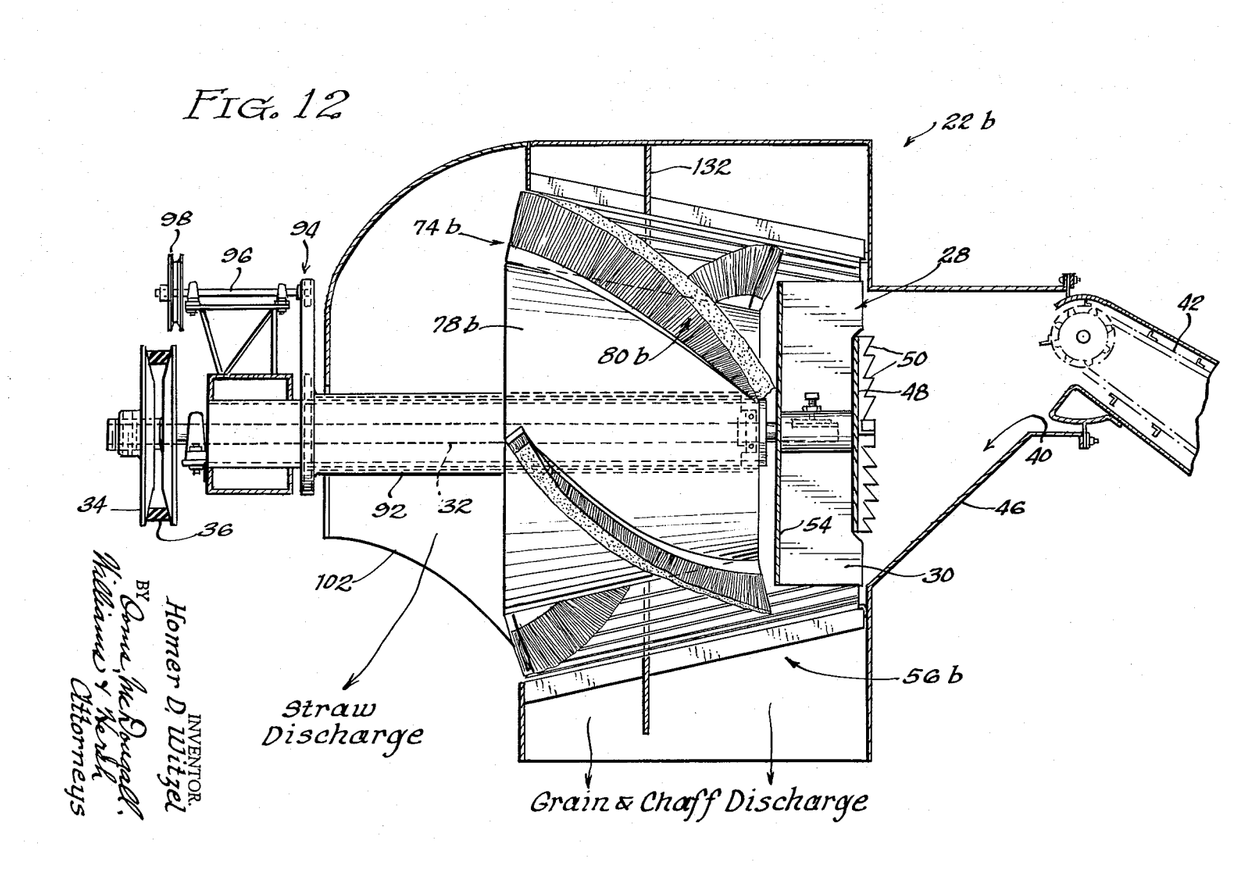
Fig. 12 is a longitudinal sectional view, somewhat similar to Fig. 2, but showing a modified threshing and straw separating unit.

Fig. 12 illustrates a somewhat modified combination threshing and straw separating unit 22B which differs from the unit already described in that the cylindrical whirler 74 is replaced by a frusto-conical whirler or sweeper 74B. Similarly, the grating 56 is replaced by a frusto-conical grating 56B. The grating 56B and the whirler 74B flare toward the rear of the whirler so that the straw spreads out into a progressively thinner mass as it is propelled rearwardly along the grating 56B. The spreading of the straw facilitates the operation of separating the grain kernels therefrom so that the kernels will be thrown outwardly through the grating 56B. Moreover, the flaring construction of the grating 56B and the whirler 74B provides additional propulsion for the straw in a rearward direction along the grating. This is due to the fact that the centrifugal force on the straw, due to its whirling motion, tends to force the straw rearwardly along the flaring grating 56B. The additional propulsive force of the straw makes it possible to handle a greater volume of straw. Moreover, it is easier to handle straw which is tough due to a high moisture content. There is less tendency for the straw to form bunches or rolls between the whirler 74B and the flaring grating 56B.

Otherwise, the combination threshing and straw separating unit 22B is much the same as the unit 22 of Figs. 1–6. Thus, the whirler 74B comprises a frusto-conical drum 74B with bristles 80B mounted thereon in spiral flights. The other components of the modified unit 22B are given the same reference characteristics as the corresponding components of the unit 22.

Figures 8, 9, 10, 11:
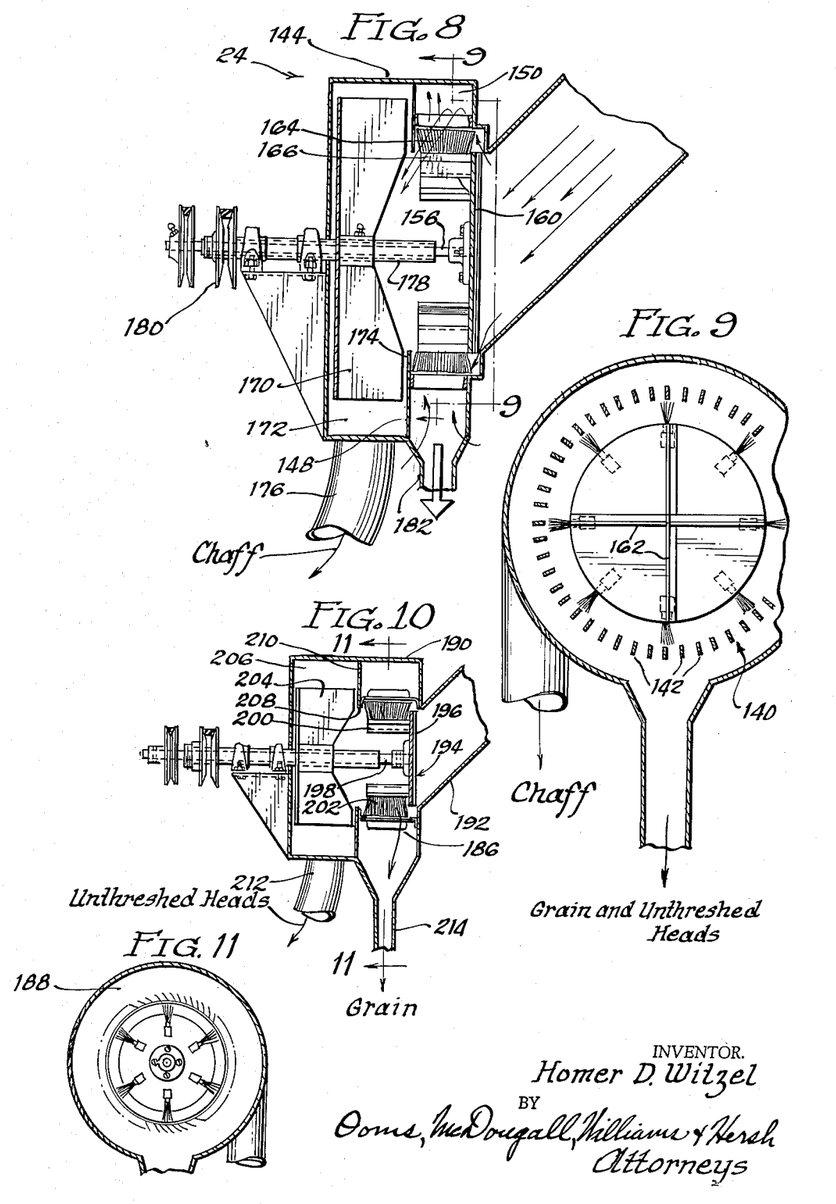
Fig. 8 is an enlarged longitudinal sectional view of a chaff separator embodied in the threshing machine of Fig. 1.
Fig. 9 is a cross-sectional view, taken generally along a line 9—9 in Fig. 8.
Fig. 10 is an enlarged longitudinal sectional view showing a cleaner or final separator embodied in the threshing machine of Fig. 1.
Fig. 11 is a cross-sectional view taken generally along a line 11—11 in Fig. 10.

As already noted, the mixture of grain kernels, chaff and unthreshed heads passes from the threshing unit 22 of Fig. 1 to the chaff separator 24, shown on an enlarged scale in Figs. 8 and 9. It will be seen that the chaff separator 24 comprises a grating or louver assembly 140 which is shown as being cylindrical in shape. The illustrated grating 140 comprises a large number of longitudinal louvers or bars 142 mounted edgewise and spaced apart at regular angular intervals.

A generally cylindrical casing 144 is mounted around the cylindrical grating 140 to receive and carry away the grain kernels which pass through the grating. Transverse partitions or end plates 146 and 148 are provided at the front and rear ends of the grating 140 to define an annular compartment 150 in the casing 144 around the grating 140.

The mixture of grain, chaff and unthreshed heads is introduced into the inside of the grating 140 by an inclined pipe or chute 152 which is mounted on an end plate 146. In order to sweep the mixture around the inside of the grating 140 a whirler or rotary sweeper 154 is mounted within the grating 140. It will be seen that the whirler 154 is mounted on a shaft 156 which is coaxial with the grating 140. A pulley 158 is mounted on a shaft 156 so that the shaft may be belted to a suitable driving motor (not shown).

At the front of the whirler 154 the grain is thrown outwardly by a front plate or disc 160 having radial bars 162 projecting forwardly therefrom. This disc 160 nearly closes the lower end of the pipe or chute 152, leaving only a narrow annular slot 163 between the rim of the disc and the open end of the pipe. The mixture of grain, chaff and unthreshed heads passes through this narrow slot 163 to the grating 140.

The disc 160 supports a plurality of sweeping elements 164 which whirl around inside the grating 140. As illustrated the sweeping elements 164 take the form of bristles mounted on bars 166 projecting rearwardly from the disc 160. The bristles 164 extend outwardly into closely adjacent relation to the grating 140. As before, the bristles 164 may be replaced with spring fingers, rubber fingers or other sweeping elements.

The whirler 154 sweeps the mixture of grain, chaff and unthreshed heads around the grating 140 at high speed, with the result that the grain kernels are thrown outwardly through the grating by centrifugal force. The unthreshed heads also pass outwardly through the grating. However, the chaff and any other light material in the mixture are drawn out the rear of the grating by a suction fan 170, which draws air inwardly through the grating. The inward blast of air does not prevent the outward movement of the grain and unthreshed heads, but it is sufficiently strong to overcome the centrifugal force on the chaff, so that the chaff is drawn into the fan 170.

The disc 160 blocks the lower end of the entrance chute or pipe 152 and prevents the entry of air through this passage, except through the narrow annular slot 163 around the disc. The narrowness of the slot 163 limits the inflow of air therethrough, so that the suction of the fan 170 will cause adequate inflow of air through the grate 140. Thus, the arrangement of the disc 160 insures that an ample current of air will be drawn through the ring or layer of grain, chaff and the like which is whirled around inside the grate.

The suction fan 170 might be arranged in various ways. In this case, the fan 170 is of the centrifugal type and is mounted in the casing 144 to the rear of the grating 140. Thus, a separate compartment 172 is provided in the casing 144 to the rear of the partition plate 148, to house the fan 170. The partition plate 148 has an opening or throat 174 therein, through which the fan 170 draws a stream of air. A tangential discharge pipe 176 is connected to the compartment 172 to discharge the chaff along with the outward air blast of the fan 170.

In this case, the fan 170 is supported by a hollow shaft 178 which is mounted coaxially around the whirler shaft 156. An adjustable V groove pulley 180 is mounted on the fan shaft 178 so that the shaft may be belted to a suitable driving motor (not shown). The speed of the fan 170 may be varied by adjusting the pulley 180.

The grain kernels and unthreashed heads pass out of the compartment 150 through a discharge pipe 182 connected to the lower end thereof. As already noted, the grain and unthreshed heads are discharged into a cleaner or final separator 26 which separates the unthreshed heads and any remaining light material from the grain kernels.

The final separator 26 may be quite similar to the chaff separator 24, but may be considerably smaller in size. Thus, the final separator 24 comprises a cylindrical grating or louver assembly 186. The grating 186 comprises a series of spaced longitudinal louvers 188 which may be somewhat more closely spaced than in the case of the louvers for the chaff separator. In this way, the unthreshed heads are prevented from passing through the grating 186. In some cases, the grating may be replaced with a screen.

A casing 190 is provided around the grating 186 to receive the grain which passes through the grating. The mixture of grain kernels and unthreshed heads is introduced into the inside of the grating 186 through a pipe or chute 192. Within the grating 186 a whirler 194 sweeps the grain and unthreshed heads around the inside of the grating. As before, the whirler 194 comprises a feeding or distributing disc 196 mounted on the front end of a supporting shaft 198. Brushes 200 are mounted on the disc 196 and are provided with bristles 202 which extend outwardly into closely adjacent relation to the grating 186. The bristles 202 sweep the kernels and unthreshed heads around the grating so that the kernels will be thrown through the grating.

The unthreshed heads are drawn from the inside of the grating 186 by a suction fan 204 mounted in a separate compartment 206 in the casing 190 to the rear of the grating 186. The fan 204 sucks air inwardly through the grating and rearwardly through a throat 208 formed in a partition plate 210. The unthreshed heads are blown out of the compartment 206 through a tangential discharge pipe 212.

As before, the disc 196 nearly blocks the lower end of the entrance pipe or chute 192, leaving only a narrow annular slot or crack 213 to admit the grain, heads and the like to the grate 186. Thus, the disc greatly restricts the inflow of air through the entrance 192, so as to insure that the fan 204 will draw an ample current of air through the grate 186 and thence through the ring of grain, heads and the like which is whirled around inside the grate.

From Fig. 1 it will be seen that the discharge pipe 212 may be extended to the inlet chute 40 of the threshing unit 22. In this way, the blast of air from the fan 204 will blow the unthreshed heads into the threshing unit 22 for rethreshing.

A pipe 214 is connected to the lower end of the housing 190 to draw off the grain by gravity. At this point the grain is clean and need not be subjected to any further separating operations. The grain may simply be collected in a tank or other suitable receptacle.

Figure 13:
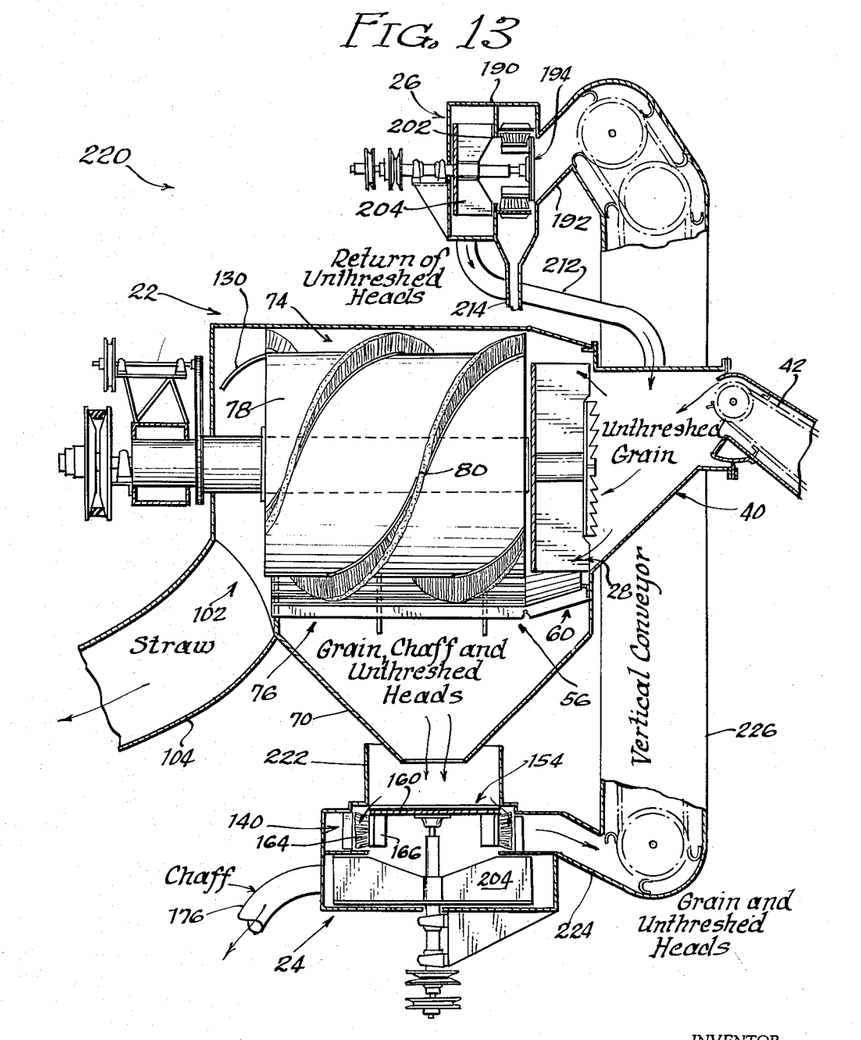
Fig. 13 is a somewhat diagrammatic elevational sectional view showing a modified threshing machine embodying the present invention.

Fig. 13 illustrates a somewhat modified threshing machine 220, which, however, embodies the same three basic units as the machine of Fig. 1. Thus, the threshing machine 22 has the combination thresher and straw separator 22, the chaff separator 24, and the final separator 26 for removing unthreshed heads from the grain. The threshing machine 220 of Fig. 13 differs from the machine of Fig. 1 in that the three units 22, 24 and 26 are arranged somewhat differently.

In the machine 220 of Fig. 13 the combination threshing and straw separating unit 22 is the same as in Fig. 1. However, the chaff separator 24 is changed in position so that the axis of the grating 140 is vertical rather than horizontal. Likewise the whirler shaft 156 and the fan shaft 178 are vertical. The inclined chute 152 of Fig. 1 is replaced with a vertical entrance pipe 222 through which the mixture of grain, chaff and unthreshed heads passes into the inside of the grating 140. Despite the change in position, the chaff separator 24 operates in exactly the same manner as in the machine of Fig. 1. The separating forces due to centrifugal action and the suction of the fan 204 are so much greater than the force of gravity that the change in the position of the chaff separator has no appreciable effect on the separating action. Thus, the grain and unthreshed heads are thrown outwardly through the grating 140 by the centrifugal action of the whirler 154. An inclined pipe or chute 224 is connected to the casing to draw off the grain and unthreshed heads. The chaff and other light material are drawn into the fan 204 and are blown out the discharge pipe 176.

In the machine of Fig. 13 the final separator 26 is mounted above the threshing unit 22. A suitable vertical conveyor 226 is provided to carry the grain kernels and unthreshed heads from the chaff separator 24 to the final separator 26. Thus, the pipe 224 empties into the conveyor 226, while the inlet chute 192 receives the grain and unthreshed heads from the upper end of the conveyor 226. The construction and operation of the final separator 26 are the same as for the machine of Fig. 1.

The elevated position of the final separator 26 has the advantage that the cleaned grain is discharged at a high elevation so that it may be conveyed by gravity to a storage tank or other receptacle. Moreover, the unthreshed heads may be returned to the threshing unit 22 with the assistance of gravity.

Returning to the threshing machine of Fig. 1, the operation may be summarized by recalling that the unthreshed grain is introduced into the threshing fan 28 through the chute 46. The distributor disc 48 on the fan throws the unthreshed grain outwardly into the outer portion of the fan. The rapidly rotating fan blades 30 engage the unthreshed grain with such shock that the kernels are loosened. Many of the kernels are immediately thrown outwardly through the grating 56 and into the casing 68.

The straw and unseparated kernels pass rearwardly along the flaring portion 60 of the grating 56 and on to the cylindrical portion 76 of the grating. The straw spreads out into a thinner layer as it passes rearwardly along the flaring portion 60. The rearward motion of the straw is due to the centrifugal force generated by the fan 28 and the air blast of the fan.

The straw passes between the cylindrical grating 76 and the sweeper or whirler 74. The bristles 80 on the whirler 74 sweep the straw around the inside of the grating 76 so that any unseparated grain kernels will be thrown outwardly through the grating. Due to the arrangement of the bristles 80 in spiral flights, the straw is propelled rearwardly at high speed and is discharged through the opening 102.

The speed of the threshing fan 28 may be varied to suit the grain being threshed and the threshing conditions. The harder the grain is to thresh the faster the fan will be operated. Different fans with different numbers of blades may be provided to accommodate extreme or adverse threshing conditions. With these adjustments the fan will give high threshing efficiency without cracking or otherwise damaging the grain to any appreciable extent.

The speed of the whirler 74 may also be varied if necessary to suit varying conditions. However, a wide range of conditions can be accommodated without changing the speed of the whirler.

For some grains or threshing conditions it may be desirable to provide a special grating with narrower openings, or even a screen, but here again a wide range of conditions can be accommodated without any change in the grating.

The grain, chaff and unthreshed heads pass to the chaff separator 24 where the mixture is swept around the inside of the grating 140 by the brushes 164. The grain and unthreshed heads are thrown outwardly through the grating 140 by centrifugal force, while the chaff is drawn off into the suction fan 170.

From the chaff separator 24 the grain and unthreshed heads pass to the final separator 26. Here again the grain and unthreshed heads are swept around the grating 186 by the brushes 202 of the whirler 194. The grain kernels are thrown through the grating 186 by centrifugal force while the unthreshed heads are drawn into the suction fan 204. The grating 186 is made sufficiently fine to insure that the unthreshed heads will not pass through, but rather will be drawn off by the air stream produced by the suction fan 204. The blast of the fan 204 is employed to return the unthreshed heads through the pipe 212 to the threshing unit 22, for rethreshing. The cleaned grain from the final separator 26 is discharged into a tank or other suitable receptacle.

For different grains and various separating conditions, each of the separators 24 and 26 may be adjusted by changing the speeds of the suction fan and the brush wheel. Moreover, different gratings, or even screens, may be employed to obtain the best separating action.

The threshing fan is capable of threshing an extremely large volume of grain. Moreover, the separating brush wheel or whirler 74 has a very high straw handling capacity. Due to the air blast from the threshing fan and the action of the spiral flights of bristles, the straw is propelled rapidly between the brush wheel and the grating. Nevertheless the separating action of the brush wheel is highly efficient because of the high centrifugal force tending to throw the grain outwardly through the grating.

Thus, the combination threshing and separating unit has an extremely high grain handling capacity which compares very favorably with prior machines of comparable size. In fact, much higher capacity may be achieved with the machines of the present invention than with prior machines.

Since the grain separating action of the present machines results from extremely strong centrifugal forces and strong air blasts, the machines are entirely insensitive to position changes. Thus, the machines need not be level, with the result that they may be employed without any need for levelling or compensating mechanisms.

All of the moving components of the machines are rotary, with the result that the machines will operate with very little vibration and wear. There are no critical adjustments and no close tolerances between the moving and stationary threshing and separating parts. The machines are relatively immune to damage from rocks or other hard articles which may be mixed with the unthreshed grain, since such articles will nearly always pass through the combination threshing and straw separator, without causing any damage.

The threshing machines of the present invention achieve all of these advantages in constructions which are rugged and relatively simple. Moreover, the machines are easy to manufacture and low in cost.

Various other modifications, alternative constructions and equivalents may be employed without departing from the true spirit and scope of the invention, as exemplified in the foregoing description, and defined in the following claims:

I claim:

1. In a threshing machine, the combination comprising a centrifugal threshing fan, a casing around said fan, a generally cylindrical grating disposed between said casing and said fan for passing grain kernels to said casing while retaining straw, a feeding and separating cylinder positioned in end to end relation to said fan and supported in coaxial relation with said fan, means for rotating said cylinder at a speed considerably less than the speed of said fan, said cylinder being disposed rearwardly of said fan, said grating extending rearwardly from said fan along said cylinder, resilient bristles mounted on said cylinder and projecting outwardly therefrom in a plurality of spiral rows for feeding straw along said cylinder and said grating away from said fan, said bristles extending into closely spaced relation to said grating for sweeping the straw across and along said grating to separate grain kernels from the straw and throw the grain kernels through said grating, a discharge opening for the straw in said casing at the end of said cylinder remote from said fan, a discharge conduit on said casing opposite said grating for discharging grain kernels, chaff and unthreshed heads, said chaff and unthreshed heads passing through said grating along with said kernels, a chaff separator for removing the chaff from said kernels, said chaff separator comprising a second generally cylindrical grating, a back fan generally coaxial with said second grating for sucking air through said second grating and drawing off the chaff, means for feeding the mixed grain, chaff and unthreshed heads to said second grating, a whirler member within said second grating and having a plurality of bristles extending into closely spaced relation to said second grating for whirling the grain, chaff and unthreshed heads along said grating, the grain kernels and unthreshed heads being thrown through said second grating by centrifugal action while the chaff is drawn off by said back fan, a second casing around said second grating for receiving the grain kernels and unthreshed heads, a cleaner for separating the unthreshed heads from the grain kernels, said cleaner comprising a third generally cylindrical grating, a suction fan for sucking air inwardly through said third grating to draw off the unthreshed heads, means for feeding the mixed kernels and unthreshed heads from said second casing to the inside of said third grating, an additional whirler within said third grating and having a plurality of bristles extending outwardly into closely spaced relation thereto, means for rotating said additional whirler to sweep the grain kernels and unthreshed heads around said third grating, the grain kernels being thrown through said third grating by centrifugal action while the unthreshed heads are drawn off by said suction fan, a casing around said third grating for receiving the cleaned grain kernels, said last mentioned casing having a grain discharge opening therein, and means for carrying the unthreshed heads from said suction fan to the threshing fan of said combination unit for rethreshing.

2. In a threshing machine, the combination comprising a first generally cylindrical grating, a centrifugal threshing fan disposed within one end of said grating, means for rotating said fan at high speed, a sweeping drum within the remainder of said grating and in end to end coaxial relation to said threshing fan, means for feeding unthreshed grain to said threshing fan on the end thereof remote from said drum, said fan being effective to thresh the grain, throw grain kernels outwardly through the grating by centrifugal action and blow the straw rearwardly between said drum and said grating, chaff and unthreshed heads being thrown through said grating along with the grain kernels, a casing around said grating for receiving the mixed kernels, chaff and unthreshed heads, said drum having a plurality of bristle-like elements extending outwardly therefrom into closely spaced relation to said grating for sweeping the straw around the inside of said grating, said bristle-like elements being arranged in spiral flights on said drum to propel the straw endwise along the grating, a discharge opening in the end of said casing remote from said fan for carrying away the straw from said drum, a chaff separator for separating the chaff from the grain and unthreshed heads, said chaff separator comprising a second generally cylindrical grating, a first suction fan for drawing air inwardly through said second grating to drawn off the chaff, means for feeding the mixed grain kernels, chaff, and unthreshed heads from said casing of said combination unit to the inside of said second grating, a whirler within said second grating and having a plurality of bristle-like elements extending outwardly therefrom into closely spaced relation to said second grating for sweeping the grain kernels, chaff and unthreshed heads around said second grating, means for rotating said whirler, the grain kernels and unthreshed heads being thrown through said second grating by centrifugal action while the chaff is drawn off by said suction fan, a second casing around said second grating for receiving the grain kernels and unthreshed heads, a cleaner for separating the unthreshed heads from the grain kernels, said cleaner comprising a third generally cylindrical grating, a second suction fan for sucking air inwardly through said third grating to draw off the unthreshed heads, means for feeding the grain kernels and unthreshed heads from said second casing to the inside of said third grating, an additional whirler within said third grating and having a plurality of bristle-like elements extending therefrom into closely spaced relation to said third grating for sweeping the grain and unthreshed heads around said third grating, the grain kernels being thrown through said third grating while said unthreshed heads are drawn off by said second suction fan, a third casing around said third grating for receiving and carrying off the grain kernels, and means for returning the unthreshed heads from said second fan to said threshing fan for rethreshing.

3. In a threshing machine, the combination comprising a grating having a flaring generally frusto-conical portion and a generally cylindrical portion connected to the larger end of said flaring portion, said grating comprising a plurality of spaced longitudinal generally parallel bars positioned edgewise in a generally radial direction, a centrifugal threshing fan positioned axially in said flaring portion of said grating, an axial shaft supporting said fan, means for rotating said shaft at a high speed, a drum at one end of said fan and within said cylindrical portion of said grating, a second shaft coaxial with said first mentioned shaft and supporting said drum, means for rotating said second shaft at a slower speed than that of said first shaft, means for feeding unthreshed grain into the end of said threshing fan remote from said drum, a distributing disc on the end of said fan remote from said drum for throwing the unthreshed grain outwardly into the outer portion of said fan, said disc having a plurality of tooth-like elements projecting from the face thereof for engaging the unthreshed grain, said disc being smaller in diameter than said fan to leave the outer portion of said fan exposed, said fan being effective to thresh the grain, throw most of the grain kernels outwardly through said flaring portion of said grating by centrifugal action, and blow the straw rearwardly between said drum and said cylindrical portion of said grating, a plurality of bristles mounted on said drum and extending outwardly therefrom in spiral flights to propel the straw along the drum away from said fan, said bristles extending adjacent said cylindrical portion of said grating for sweeping the straw around said grating and throwing grain kernels outwardly therethrough, a casing around said grating for receiving and carrying off the grain kernels, said casing having an opening in the end thereof remote from said fan for receiving and discharging the straw from said drum.

4. In a threshing machine, the combination comprising a generally frusto-conical grating having a plurality of spaced longitudinal grating bars disposed edgewise in a generally radial direction, a threshing fan positioned within the small end of said grating, a shaft supporting said fan and extending axially of said grating, a frusto-conical drum within the large end of said grating at the rear end of said fan, said drum and said grating flaring in diameter away from said fan, a second shaft supporting said drum and coaxial with said first mentioned fan shaft, means for feeding unthreshed grain into the front end of said fan, a radial feeder disc mounted on the front end of said fan and covering the central portion thereof while leaving the outer portion exposed, said disc having elements projecting from the face thereof for feeding the unthreshed grain outwardly into the outer portion of said fan, the unthreshed grain being drawn into said fan by the suction thereof, said fan being effective to thresh said grain and throw grain kernels outwardly through said grating by centrifugal action while blowing the straw rearwardly between said drum and said grating, a plurality of bristle-like elements mounted on said drum in spiral flights for propelling the straw rearwardly along said grating away from said fan, said bristle-like elements projecting into closely adjacent relation to said grating for sweeping the straw around the inside of said grating so as to throw grain kernels outwardly through said grating by centrifugal action, means for rotating said second drum-supporting shaft at a speed less than the speed of said fan, a casing around said grating for receiving and carrying away the grain kernels, said casing having a transverse partition therein to prevent ricocheting grain kernels from falling inwardly through said grating, and discharge means at the rear end of said casing for receiving and discharging the straw from the rear end of said drum.

5. In a separator for removing light material from grain kernels, the combination comprising a generally cylindrical grating having a plurality of spaced longitudinal grating bars, a casing having an annular front portion defining a compartment around said grating for receiving and carrying away the grain kernels therefrom, said casing having a rear portion defining a generally cylindrical fan compartment to the rear of said grating, a suction fan disposed in said fan compartment, a shaft supporting said fan and disposed in generally coaxial relation to said grating, means for rotating said fan shaft at high speed so that said fan will suck air inwardly through said grating, means for feeding the grain and light material into the inside of said grating at the end thereof opposite from said fan, a whirler disposed within said grating, a shaft supporting said whirler and positioned in coaxial relation to said fan shaft, means for rotating said whirler shaft, a feeder disc on said whirler adjacent the front end of said grating with means on said disc for feeding the grain and light material outwardly between said whirler and said grating, and a plurality of bristle-like elements extending outwardly from said whirler into closely adjacent relation to said grating for sweeping the grain kernels and light material around said grating, said whirler being effective to throw the grain kernels outwardly through said grating while the light material is drawn off by said fan.

6. In a separator for removing light material from grain kernels, the combination comprising a generally cylindrical foraminous member, a casing having an annular front portion defining a compartment around said member for receiving and carrying away the grain kernels therefrom, said casing having a rear portion defining a generally cylindrical fan compartment to the rear of said grating, a suction fan disposed in said fan compartment, a shaft supporting said fan and disposed in generally coaxial relation to said member, means for rotating said fan shaft at high speed so that said fan will suck air inwardly through said member, means for feeding the grain and light material into the inside of said member at the end thereof opposite from said fan, a whirler disposed within said member, a shaft supporting said whirler and positioned in coaxial relation to said fan shaft, means for rotating said whirler shaft, a feeder disc on said whirler adjacent the front end of said member with means on said disc for feeding the grain and light material outwardly between said whirler and said member, and a plurality of bristle-like elements extending outwardly from said whirler into closely adjacent relation to said member for sweeping the grain kernels and light material around said member, said whirler being effective to throw the grain kernels outwardly through said member while the light material is drawn off by said fan.

7. In a threshing machine, the combination comprising a generally tubular foraminous member, a threshing fan positioned within said member, means for rotating said fan, a drum within said member at the rear end of said fan, means for rotating said drum, means for feeding unthreshed grain into the front end of said fan, said fan being effective to thresh said grain and throw grain kernels outwardly through said member by centrifugal action while blowing the straw rearwardly between said drum and said member, a plurality of sweeping elements mounted on said drum in spiral flights for propelling the straw rearwardly along said member away from said fan, said sweeping elements projecting into closely adjacent relation to said member for sweeping the straw around the inside of said member so as to throw grain kernels outwardly through said member by centrifugal action, said sweeping elements comprising a plurality of spring wire fingers mounted on said drum in substantially continuous spiral flights with a soft resilient strip mounted on said drum in front of each of said flights, a casing around said member for receiving and carrying away the grain kernels, and discharge means at the rear end of said casing for receiving and discharging the straw from the rear end of said drum.

8. The subject matter as claimed in claim 7 with the said fan embodying a pair of plates in longitudinal spaced relation to each other, a plurality of blades extending in radial outwardly spaced relation to each other and from the center of said plates, said blades having one edge on each one of the said plates and the said blades being positioned between said plates.

9. In a threshing machine, the combination comprising a first generally tubular foraminous member, a centrifugal threshing fan disposed within one end of said member, means for rotating said fan at high speed, a sweeping drum within the remainder of said member to the rear of said threshing fan, means for rotating said drum, means for feeding unthreshed grain to the front end of said threshing fan, said fan being effective to thresh the grain, throw grain kernels outwardly through said member by centrifugal action and blow the straw rearwardly between said drum and said member, chaff and unthreshed heads being thrown through said grating along with the grain kernels, a casing around said member for receiving the mixed kernels, chaff and unthreshed heads, said drum having a plurality of sweeping elements extending outwardly therefrom into closely spaced relation to said member for sweeping the straw around the inside of said member, said sweeping elements being arranged in spiral flights on said drum to propel the straw endwise along said member, a discharge opening in the end of said casing remote from said fan for carrying away the straw from said drum, a chaff separator for separating the chaff from the grain and unthreshed heads, said chaff separator comprising a second generally cylindrical foraminous member, a first suction fan for drawing air inwardly through said second member to draw off the chaff, means for feeding the mixed grain kernels, chaff, and unthreshed heads from said casing of said combination unit to the inside of said second member, a whirler within said second member and having a plurality of sweeping elements extending outwardly therefrom into closely spaced relation to said second member for sweeping the grain kernels, chaff and unthreshed heads around said second member, means for rotating said whirler, the grain kernels and unthreshed heads being thrown through said second member by centrifugal action while the chaff is drawn off by said suction fan, a second casing around said second member for receiving the grain kernels and unthreshed heads, a cleaner for separating the unthreshed heads from the grain kernels, said cleaner comprising a third generally cylindrical foraminous member, a second suction fan for sucking air inwardly through said third member to draw off the unthreshed heads, means for feeding the grain kernels and unthreshed heads from said second casing to the inside of said third member, an additional whirler within said third member and having a plurality of sweeping elements extending therefrom into closely spaced relation to said third member for sweeping the grain and unthreshed heads around said third member, the grain kernels being thrown through said third member while said unthreshed heads are drawn off by said second suction fan, a third casing around said third member for receiving and carrying off the grain kernels, and means for returning the unthreshed heads from said second fan to said threshing fan for rethreshing.

10. In a threshing machine, the combination comprising a centrifugal fan, a shaft supporting said fan, means for rotating said shaft, means for feeding unthreshed grain to one end of said fan, said fan being effective to thresh said grain, a casing around said fan, a generally cylindrical grating disposed between said casing and said fan for passing grain kernels to said casing while retaining straw, a whirler positioned in end-to-end relation to said fan and supported by a second shaft coaxial with said fan shaft, means for rotating said second shaft, said cylinder being disposed on the opposite end of said fan from said means for feeding grain thereto, said grating extending rearwardly from said fan along said whirler, sweeping elements mounted on said whirler and projecting outwardly therefrom in a plurality of spiral rows for feeding straw along said grating away from said fan, said sweeping elements extending into closely spaced relation to said grating for sweeping the straw around said grating to separate grain kernels from the straw and throw the grain kernels through said grating, a discharge opening for the straw in said casing at the end of said whirler remote from said fan, a discharge conduit on said casing opposite said grating for discharging grain kernels, chaff and unthreshed heads, said chaff and unthreshed heads passing through said grating along with said kernels, a chaff separator for removing the chaff from said kernels, said chaff separator comprising a second generally cylindrical grating, a fan for sucking air inwardly through said second grating and drawing off the chaff, means for feeding the mixed grain, chaff and unthreshed heads to said second grating, a whirler member within said second grating and having a plurality of sweeping elements extending into closely spaced relation to said second grating for whirling the grain, chaff and unthreshed heads around said grating, the grain kernels and unthreshed heads being thrown through said second grating by centrifugal action while the chaff is drawn off by said fan, a second casing around said second grating for receiving the grain kernels and unthreshed heads, a cleaner for separating the unthreshed heads from the grain kernels, said cleaner comprising a third generally cylindrical grating, a suction fan for sucking air inwardly through said third grating to draw off the unthreshed heads, means for feeding the mixed kernels and unthreshed heads from said second casing to the inside of said third grating, an additional whirler within said third grating and having a plurality of sweeping elements extending outwardly into closely spaced relation thereto, means for rotating said additional whirler to sweep the grain kernels and unthreshed heads around said third grating, the grain kernels being thrown through said third grating by centrifugal action while the unthreshed heads are drawn off by said last-mentioned suction fan, a casing around said third grating for receiving the cleaned grain kernels, said last-mentioned casing having a grain discharge opening therein, and means for carrying the unthreshed heads from said last-mentioned suction fan to the threshing fan of said combination unit for rethreshing.

11. In a separator for removing light material from grain kernels, the combination comprising a generally cylindrical foraminous member, a whirler within said member, means for rotating said whirler, an entrance conduit for feeding the mixed grain kernels and light material into the inside of said member adjacent one end thereof, said whirler having a disc thereon blocking said entrance conduit except for a narrow annular slot around the periphery of said disc, impeller means on said whirler for whirling the grain and light material around the inside of said member, means for causing inward flow of air through said member to carry off the light material, the grain being thrown through said member by centrifugal action while the light material is carried off by said inward flow of air, and a casing around said member for receiving and carrying off the grain kernels.

References Cited in the file of this patent

UNITED STATES PATENTS

| | | |
|---|---|---|
| 281,512 | Hudson | July 17, 1883 |
| 486,441 | Empson | Nov. 22, 1892 |
| 796,567 | Davis et al. | Aug. 8, 1905 |
| 1,184,999 | Reason | May 30, 1916 |
| 1,688,662 | Schlayer | Oct. 23, 1928 |
| 2,053,148 | James | Sept. 1, 1936 |

FOREIGN PATENTS

| | | |
|---|---|---|
| 1,095,015 | France | Dec. 15, 1954 |
| 152,520 | Sweden | Sept. 15, 1955 |